Aug. 23, 1949.                I. WOLFF                    2,480,068
                         RADIO NAVIGATION AID
                         Filed Aug. 9, 1946
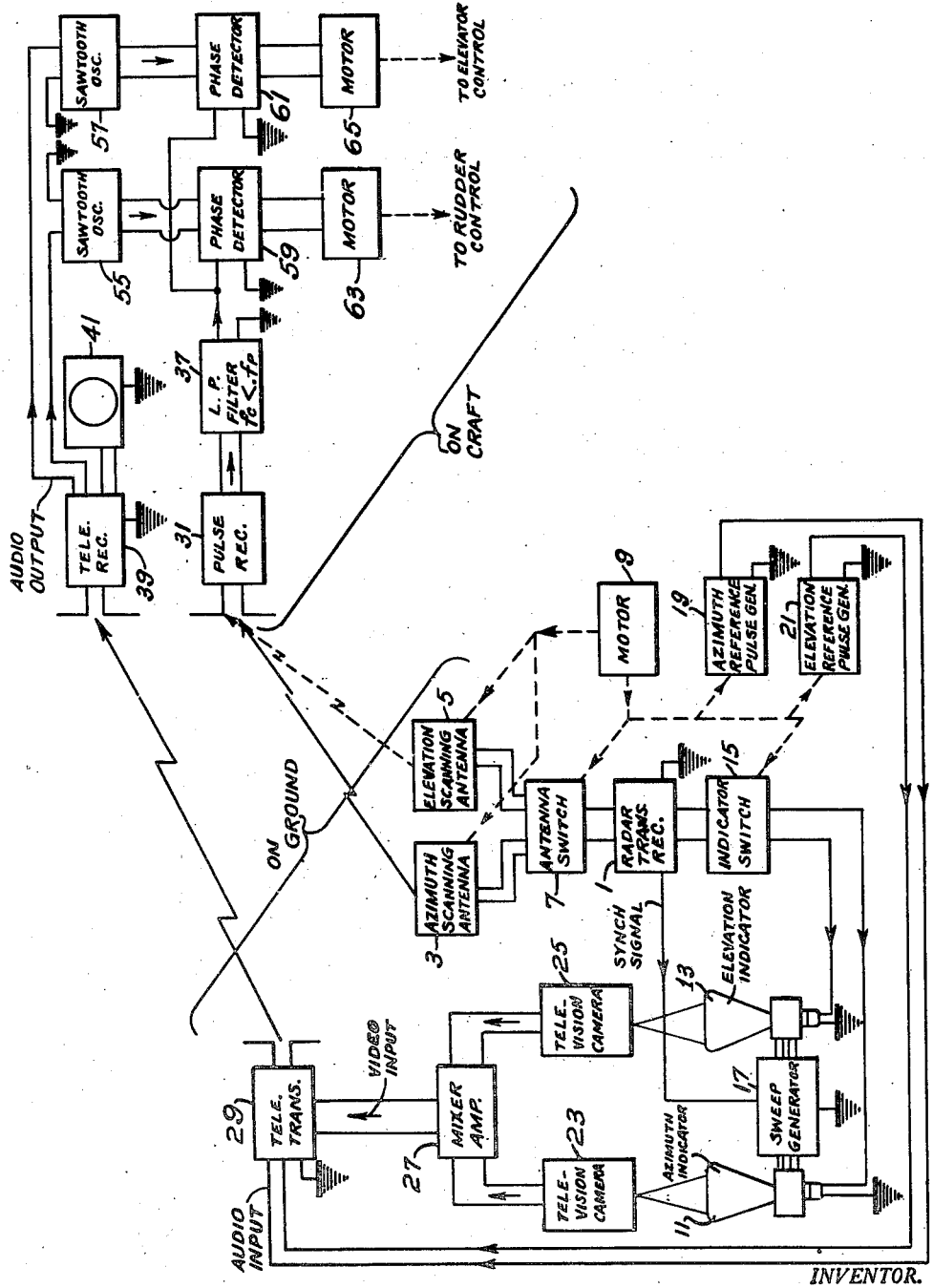
INVENTOR.
IRVING WOLFF
BY
ATTORNEY Patented Aug. 23, 1949

2,480,068

UNITED STATES PATENT OFFICE 2,480,068

RADIO NAVIGATION AID

Irving Wolff, Princeton, N. J., assignor to Radio Corporation of America, a corporation of Delaware Application August 9, 1946, Serial No. 689,387

11 Claims. (Cl. 343—6)

This invention relates to improvements in ground approach control systems for aircraft, such as are used to guide an airplane to a landing during low visibility conditions. One such system, wherein the position of the aircraft is determined and indicated on the ground by radio locator means, and the indications transmitted to the craft by a television system, is described in copending U. S. patent application Serial No. 623,106 filed October 18, 1945 by Irving Wolff and Paul J. Herbst, and entitled Instrument landing system which issued January 18, 1949 as Patent No. 2,459,481. In the system of said copending application, the pilot observes the visual indications on a television receiver and guides the craft accordingly along the selected glide path.

The principal object of the present invention is to provide, in a system of the described type, methods of and means for automatically guiding an aircraft to a landing, or to an approach sufficiently close to the point of landing that the pilot may complete the landing by direct visual observation of the terrain.

The invention will be described with reference to the accompanying drawing, which is a schematic block diagram showing both the equipment on the aircraft and the ground station equipment.

The ground station includes a radar set 1, of the type adapted to transmit and receive cyclically repeated pulses of high frequency energy. Instead of the single antenna system usually employed with such devices, the radar set 1 is provided with two antennas, 3 and 5, and is connected thereto through a switch device 7.

The antennas 3 and 5 may each be of the type described in copending U. S. patent application Serial No. 533,311 filed April 29, 1944 by Harley Iams, and entitled Radio wave devices. The antenna 3 is designed as described in said Iams application to provide a fan-shaped beam lying substantially in a vertical plane, which may be oscillated from side to side by rotation of one of the elements of the structure. A motor 9 is coupled to the antenna 3 for this purpose.

The antenna 5 is similar to the antenna 3, but disposed at right angles thereto, thus providing a fan-shaped beam lying in a plane perpendicular to that of the antenna 3, and oscillable up and down. The antenna 5 is also coupled to the motor 9.

The switch 7 may be of the type described in copending U. S. patent application Serial No. 485,388, filed May 1, 1943 by Donald W. Peterson and entitled An R-F switch, which issued September 17, 1946 as Patent No. 2,407,847 or any other known means for connecting the radar set 1 alternately to the antennas 3 and 5. The switch 7 is either driven directly by the motor 9, or through intermediate coupling means such as an elctromagnet controlled by an auxiliary switch driven by the motor 9. In either event, the switch 7 connects the antenna 3 to the set 1 during one complete cycle of oscillation of its beam, then connects the antenna 5 to the radar set for one cycle, and so on.

The radar set 1 is provided with two cathode ray indicators, 11 and 13, which are connected to it through a switch 15. The switch 15 is driven by the motor 9 to connect the indicator 11 when the antenna 3 is being used, and to connect the indicator 13 in synchronism with the connection of the antenna 5. A sweep voltage generator 17 is connected to the deflection circuits of both indicator tubes 11 and 13, and is provided with a synchronizing connection to the radar set 1.

The antennas 3 and 5 are set up so that the respective sectors which they scan each include the line to be followed by an aircraft in landing. A pair of reference pulse generators 19 and 21 which may include ordinary cam actuated electric switches driven by the motor 9, are arranged to provide characteristic timing signals substantially coincidentally with the passage of the beams of the antennas 3 and 5 respectively through the line of the desired glide path.

Television cameras 23 and 25 are provided adjacent the indicators 11 and 13 respectively, and their outputs are applied to a mixer amplifier 27. The composite output of the mixer 27 is applied to the video input of a television transmitter, which may be of the type described in U. S. Patent No. 2,089,639 to Bedford. Said type of television transmitter enables both a video signal and one or more audio signals to be transmitted independently of each other on a single carrier. The reference pulses of audio voltage from the generators 19 and 21 are applied to the audio input circuit of the transmitter 29, where they are superimposed distinguishably on the video synchronizing signal, as described in said Bedford patent.

The equipment carried by the aircraft includes a pulse receiver 31, which operates at the same frequency as the radar set 1. Signals from the ground station radar are picked up by the receiver 31 and applied to a low pass filter 37, designed to cut off at a frequency lower than the pulse repetition frequency of the radar set 1.

The aircraft carries a television receiver 39, designed to cooperate with the transmitter 29, and provided with a kinescope 41 for reproducing the composite image derived from the radar indicators 11 and 13. The reference pulses from the generators 19 and 21 are reproduced in separate audio output circuits of the receiver 39.

A pair of sawtooth wave oscillators 55 and 57, designed to operate at the frequency of oscillation of the beams of the antennas 3 and 5, are connected to synchronize with the respective reference pulses. The synchronization arrangement may be that shown and described by K. R. Wendt and G. L. Fredendall in pages 7–15 of the January 1943 issue of the "Proceedings of the I. R. E.," published by the Institute of Radio Engineers, Inc., 330 West 42nd Street, New York city.

The outputs of the sawtooth oscillators 55 and 57 are applied to phase detectors 59 and 61, of the type described in the above-mentioned publication. The low pass filter 37 is connected to both of the detectors 59 and 61. The output circuits of the detectors 59 and 61 are connected to reversible motors 63 and 65 respectively.

It will be evident to those skilled in the art that relays or amplifier means may be included if required between the phase detectors and the motors. The motor 63 is coupled to the rudder control mechanism (not shown) of the aircraft, and the motor 65 is similarly coupled to the elevator control mechanism. In an aircraft equipped with an automatic pilot mechanism, the motors 63 and 65 may be coupled directly to the usual biassing controls of said mechanism. Preferably the arrangement is similar to that described in copending U. S. Patent Application Serial No. 484,458 filed April 24, 1943 by Royden C. Sanders, Jr. and John H. Purl and entitled Aircraft control system which issued June 22, 1948 as Patent No. 2,443,748.

In the operation of the described system, the radar set 1 produces pulses of radio frequency energy, repeating at a rate of, for example, 10,000 pulses per second. This energy is radiated by one of the antennas, say the antenna 3. The motor 9 causes the antenna beam to scan a predetermined sector which includes the glide path.

When the beam is pointing at the aircraft the pulse modulated signal is reflected thereby and the reflected signal is picked up by the antenna 3, detected by the radar set 1 and applied to the indicator 11 to provide a visual indication of the range and azimuth of the craft from the ground station.

When the antenna 3 completes its scan, the connections to the radar set are transferred to the antenna 5 and the indicator 13, whereupon the angle of elevation and the range of the aircraft are displayed visually on the indicator tube 13.

The above described sequence of operations is repeated at a rate of perhaps 15 cycles per second, allowing 1/30 second for a complete scan by each antenna. The visual indications, which may be of the type described in the aforementioned Wolff and Herbst application, are picked up by the television cameras 23 and 25 and converted to video signals. These signals are combined in the mixer 27, transmitted by the transmitter 29, received by the receiver 39 on the aircraft, and reproduced on the kinescope tube 41.

The output of the filter 37 comprises pulses similar to the timing pulses from the receiver 39, but corresponding in timing to the position of the aircraft within the sectors scanned by the antennas 3 and 5. These pulses are applied to the phase detectors 59 and 61 for comparison with the sawtooth wave outputs of the oscillators 55 and 57 respectively. The phase detector 59 provides a D. C. output whose magnitude and polarity depend upon the relative timing of the applied pulse with respect to the sawtooth wave. Thus if the aircraft is at an azimuth with respect to the ground station corresponding to the desired glide path, the output of the phase detector 59 is zero. If the craft is to one side of the desired glide path, the output of the detector 59 is of corresponding polarity and has a magnitude depending upon the deviation of the craft from the glide path.

The phase detector 61, like the phase detector 59, provides an output corresponding in magnitude and polarity to the deviation of the aircraft in elevation from the desired glide path. The phase detectors 59 and 61 control the motors 63 and 65 respectively to steer the craft both horizontally and vertically toward the correct glide path. The aircraft thus follows the glide path, automatically correcting any deviations therefrom while continuous visual indication of a position of the craft along the glide path appears on the kinescope 41. It should be noted that the operation of the system is not restricted to guiding only one craft at a time. Any number of craft, subject only to limitations imposed by the size of the landing area, can be controlled simultaneously, regardless of the position of each craft along the glide path.

Although the invention has been described as embodied in combination with a television relay instrument landing system of the type described in the aforementioned Wolff and Herbst application, it will be apparent that the automatic control system may be used without visual indication. In this case, the radar set 1 may be replaced by a simple pulse transmitter, no receiver being required on the ground. The television transmitter 29 may be an ordinary broadcast transmitter modulated by the reference pulses from the generators 19 and 21.

Summarizing briefly, the described invention comprises means for transmitting, from a predetermined point on the ground, directional beams which are oscillated in azimuth and elevation respectively through sectors including the desired glide path. Reference pulses are also transmitted from the ground in synchronism with the passage of said beams through the glide path. As each beam strikes the aircraft a pulse is received at a time corresponding to the position of the craft with respect to the glide path. These pulses are compared with the reference pulses to control the steering of the craft so as to follow the glide path.

I claim as my invention:

1. A system for automatically controlling an aircraft to approach a predetermined point on the ground along a predetermined glide path, including on the ground two radio locator systems of the sector scanning type, one scanning in azimuth through a horizontal sector which includes said glide path and the other scanning in elevation through a vertical sector including said glide path, said radio locator systems operating alternately to provide substantially continuous visual indications of the position of said craft with respect to said glide path, and television transmitter means for radiating signals corresponding to said images; means for generating reference signals synchronized with said vertical and horizontal scanning respectively, and means for superimposing said reference signals upon said television signals; a television receiver on said aircraft, including means for reproducing said reference signals, a pulse receiver on said craft responsive to signals transmitted by said radio locator systems to provide output signals synchronous with the scanning thereof and with timings depending upon the position of said craft with respect to said glide path; and means responsive to the relative timings of said reference signals and said pulse-derived signals to steer said craft to and along said glide path.

2. A system for automatically controlling an aircraft to approach a predetermined point on the ground along a predetermined glide path, including on the ground a radio locator system of the sector scanning type, operating to provide a substantially continuous visual indications of the position of said craft with respect to said glide path, and television transmitter means for radiating signals corresponding to said images; means for generating a reference signal synchronized with the scanning of said locator system through said glide path, and means for superimposing said reference signal upon said television signals; a television receiver on said aircraft, including means for reproducing said reference signal, a receiver on said craft responsive to signals transmitted by said radio locator system to provide output signals synchronous with the scanning of said craft by said locator system; and means responsive to the relative timings of said reference signals and said last-mentioned signals to steer said craft to and along said glide path.

3. A system for automatically controlling an aircraft to approach a predetermined point on the ground along a predetermined glide path, including on the ground a radio locator system including two antennas of the sector scanning type, one scanning in azimuth through a horizontal sector which includes said glide path and the other scanning in elevation through a vertical sector including said glide path, said antennas operating alternately and causing said locator system to provide substantially continuous visual indications of the position of said craft with respect to said glide path, and television transmitter means for radiating signals corresponding to said images; means for generating reference signals synchronized with said vertical and horizontal scanning respectively, and means for superimposing said reference signals upon said television signals; a television receiver on said aircraft, including means for reproducing said reference signals, a receiver on said craft responsive to signals transmitted by said ratio locator system to provide output signals synchronous with the scanning of said craft by said antennas; and means responsive to the relative timings of said reference signals and said last-mentioned signals to steer said craft to and along said glide path.

4. A system for controlling an aircraft to approach a predetermined point on the ground along a predetermined glide path, including means near said point on the ground for directionally transmitting a radio signal alternately in two fan-shaped beams, one lying substantially in a vertical plane, oscillating in azimuth through a sector including said glide path, and the other lying in a plane substantially at right angles to said first plane and oscillating in elevation through a sector including said glide path, and further means on the ground for transmitting a time reference signal substantially coincident with the passage of each of said beams through said glide path; receiver means on said craft and responsive to said directional signals to provide an output pulse each time either of said beams is directed at said craft, further receiver means on said craft and responsive to said time reference signals to provide reference output pulses each time either of said beams is directed along said glide path; and means responsive to the relative timings of said first-mentioned output pulses with respect to the corresponding reference pulses to steer said craft into and along said glide path.

5. A system for controlling an aircraft to approach a predetermined point on the ground along a predetermined glide path, including means near said point on the ground for directionally transmitting a radio signal in a beam oscillating so as to scan a solid angle including said glide path, further means on the ground for transmitting a time reference signal substantially coincident with the passage of said beam through said glide path; receiver means on said craft and responsive to said directional signals to provide an output pulse each time said beam is directed at said craft, further receiver means on said craft and responsive to said time reference signals to provide reference output pulses each time said beam is directed along said glide path; and means responsive to the relative timing of said first-mentioned output pulse with respect to said reference pulse to steer said craft into and along said glide path.

6. A system for controlling an aircraft to fly along a predetermined path, including means on the ground for directionally transmitting a radio signal in a beam oscillating through a sector including said path, further means on the ground for transmitting a time reference signal substantially coincident with the passage of said beam through said path; receiver means on said craft and responsive to said directional signals to provide an output pulse each time said beam is directed at said craft, further receiver means on said craft and responsive to said time reference signals to provide reference output pulses each time said beam is directed along said path; and means responsive to the relative timing of said first-mentioned output pulse with respect to said reference pulse to steer said craft into and along said path.

7. A system for controlling an aircraft to follow a predetermined path, including means directively radiating two signals and cyclically displacing the directive patterns thereof through respective sectors substantially at right angles to each other which include said path, receiving means on said craft responsive to said transmitted signals to provide outputs in accordance with the respective passages of said directive patterns through predetermined positions with respect to said craft, means providing further signals in accordance with the respective passages of said directive patterns through said predetermined path, and means responsive to said outputs and to said respective further signals to control the direction of flight of said craft.

8. A system for automatically controlling an aircraft to follow a predetermined path, including means directively transmitting a signal and cyclically displacing the directive pattern thereof through a sector which includes said path, receiving means on said craft responsive to said transmitted signal to provide an output in accordance with the passage of said directive pattern through a predetermined position with respect to said craft, means providing a timing signal on said aircraft in accordance with the passage of said directive pattern through said predetermined path, and means responsive to said output and to said timing signal to control the direction of flight of said craft.

9. A system for automatically controlling an aircraft to follow a predetermined path, including a reference station, means at said station directively transmitting a signal and cyclically displacing the directive pattern thereof through a sector which includes said path, receiving means on said craft responsive to said transmitted signal to provide output coincident with the passage of said directive pattern through said craft, means providing a further signal on said aircraft coincident with the passage of the principal axis of said directive pattern through said predetermined path, and means responsive to said output and to said further signal to control the direction of flight of said craft.

10. A system for controlling an aircraft to follow a predetermined path, including means directively radiating a plurality of signals and cyclically displacing the directive patterns thereof through respective sectors which include said path, receiving means on said craft responsive to said transmitted signals to provide outputs coincident with the respective passages of said directive patterns through predetermined positions with respect to said craft, means providing further signals coincident with the respective passages of said directive patterns through said predetermined path, and means responsive to said outputs and to said respective further signals to control the direction of flight of said craft.

11. A system for automatically controlling a mobile craft to follow a predetermined path, including means directively transmitting a signal and periodically sweeping the directive pattern thereof through said path, receiving means on said craft responsive to said transmitted signal to provide an output in accordance with the passage of said directive pattern through a predetermined position with respect to said craft, means providing a timing signal on said aircraft in accordance with the passage of said directive pattern through said predetermined path, and means responsive to said output and to said timing signal to steer said craft.

IRVING WOLFF.

REFERENCES CITED

The following references are of record in the file of this patent:

UNITED STATES PATENTS

| Number | Name | Date |
|---|---|---|
| 2,027,530 | Hammond | Jan. 14, 1936 |
| 2,176,469 | Moueix | Oct. 17, 1939 |
| 2,321,698 | Nolde | June 15, 1943 |
| 2,397,477 | Kellogg | Apr. 2, 1946 |
| 2,423,336 | Moseley | July 1, 1947 |